United States Patent Office 3,050,492
Patented Aug. 21, 1962

3,050,492
LOW TEMPERATURE FLUORINATED ORGANO-SILICON RUBBER
Keith E. Polmanteer and Eric D. Brown, Midland, Mich., assignors to Dow Corning Corporation, Midland, Mich., a corporation of Michigan
No Drawing. Filed Dec. 29, 1958, Ser. No. 783,124
9 Claims. (Cl. 260—37)

This invention relates to fluorinated copolymeric organosiloxane rubbers characterized by their flexibility at extremely low temperatures.

Organosiloxane rubber is a well-known and highly useful material. In the past, organosiloxane rubber having flexibility at particularly low temperatures has been produced by incorporating monocyclic aryl groups (preferably phenyl groups and preferably in the form of phenylmethylsiloxane units) into an organosiloxane copolymer which is otherwise generally composed of dimethylsiloxane polymeric units. The commercially available organosiloxane rubbers all have been relatively poor in their resistance to organic solvents, particularly to hydrocarbon solvents, as evidenced by a high degree of swelling when exposed to said solvents. The "low temperature" organosiloxane rubbers have been even poorer in their resistance to solvents than the ordinary organosiloxane rubbers, and often are completely disintegrated by some solvents.

It is a primary object of the present invention to provide organosiloxane rubbers which are equal to or superior to the prior organosiloxane rubbers in their ability to remain flexible at exceedingly low temperatures, and which at the same time have a greatly improved resistance to organic solvents.

It has been found that the above objective can be attained by incorporating a very specific range of certain fluoroalkyl substituted organosiloxane units into what are otherwise conventional organosiloxane rubber formulations. Thus the present invention particularly relates to a vulcanizable composition comprising (I) a copolymeric organosiloxane consisting essentially of (A) from 6.5 to 15 inclusive mol percent of polymeric units of the formula

$[CF_3(CF_2)_xCH_2CH_2](CH_3)_y(CF_3CH_2CH_2)_zSiO$ where $x$, $y$ and $z$ are integers of from 0 to 1 inclusive, the sum of $x+z$ being from 0 to 1 inclusive and the sum of $y+z$ being 1, and (B) from 85 to 93.5 inclusive mol precent of units of the formula $(CH_3)_2SiO$, there being a maximum of 9.95% by weight fluorine in said copolymeric organosiloxane, (II) a filler, and (III) an organosiloxane vulcanizing agent. The invention also relates to the vulcanized product of the above defined composition.

It will be seen from the above definition that there are 3 specific organosiloxane units which fall within the scope of the defined (A) units. These are the units of the formula $CF_3CH_2CH_2(CH_3)SiO$, $(CF_3CH_2CH_2)_2SiO$ and $CF_3CF_2CH_2CH_2(CH_3)SiO$. These units can be present in the copolymer either singly or in any combination so long as the total amount of such units present falls within the required range and so long as the amount of fluorine atoms present in the copolymer does not exceed 9.95% by weight. If the amount of (A) units employed is above the defined range, the desired flexibility at extremely low temperatures is lost. Below the defined range solvent resistance is impaired and low temperature properties are lost. The most preferred range of (A) units in the copolymer is from 7.5 to 12.5 inclusive mol percent.

The copolymers employed herein may be prepared by any of the conventional methods for copolymerizing organosiloxanes. This includes the cohydrolysis of the corresponding monomeric silanes and the conventional acid or alkaline catalyzed copolymerization of the corresponding siloxanes. The preferred method is that of copolymerizing the cyclic trimers or tetramers of the (A) type units with the cyclic trimers or tetramers of the $(CH_3)_2SiO$ units, using an alkaline catalyst such as NaOH, KOH, or sodium or potassium dimethylsilanolates in an amount to provide 1 alkali metal atom for every 500 to 20,000 Si atoms.

The organosiloxane units (A) are preferably derived from the hydrolysis of the corresponding chlorosilanes of the formula

$[CF_3(CF_2)_xCH_2CH_2](CH_3)_y(CF_3CH_2CH_2)_zSiCl_2$

These chlorosilanes can be prepared by the methods described in greater detail in the copending Holbrook application, Serial No. 575,371, filed April 2, 1956, now abandoned, and assigned to the assignee of the present invention. Briefly described, one preferred method is that of reacting an olefin of the formula

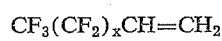
$CF_3(CF_2)_xCH=CH_2$ with $CH_3SiHCl_2$ in the presence of a catalyst such as chloroplatinic acid or platinum deposited upon finely divided charcoal. Alternatively the above process can be carried out with $HSiCl_3$ and $CF_3CH=CH_2$ to produce $CF_3CH_2CH_2SiCl_3$, and the latter is then reacted with either a methyl Grignard reagent to introduce one methyl group or with a Grignard reagent prepared from $CF_3CH_2CH_2Br$ to introduce the second $CF_3CH_2CH_2-$ group.

It is to be understood that the copolymeric organosiloxanes employed herein may contain small amounts of monoorganosiloxane units, as are normally present in commercially produced copolymers of the defined type. They may also contain small amounts of triorganosiloxane units, which can be introduced either as impurities or deliberately in order to achieve desirable handling or storage properties in the defined copolymers. One preferred type of copolymer herein contains as much as 0.03 mol percent of triorganosiloxane units of the formula

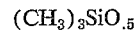
$(CH_3)_3SiO_{.5}$ or $(CH_3)_2(CH_2=CH)SiO_{.5}$. Such triorganosiloxane units are known as "end-blocking units" in the trade, and they aid in preventing premature hardening of the unvulcanized compositions. Preferably the degree of substitution in the copolymer ranges from 1.98 to 2.02 organic groups attached to silicon per silicon atom.

Another desirable diorganosiloxane unit which can be present in the copolymer if desired is the unit of the formula $(CH_2=CH)CH_3SiO$. When employed, this unit is preferably present in an amount of from 0.05 to 0.35 inclusive mol percent. The incorporation of the latter units enables one to achieve better control over the vulcanization of the copolymer and imparts other desirable properties to the resulting product. The most preferred copolymer is that of (A) from 7.5 to 14.95 inclusive mol percent of polymeric units of the formula

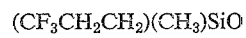
$(CF_3CH_2CH_2)(CH_3)SiO$ (B) from 85 to 92.45 inclusive mol percent of units of the formula $(CH_3)_2SiO$, (C) from 0.05 to 0.35 inclusive mol percent of units of the formula $(CH_2=CH)CH_3SiO$, and (D) from 0 to 0.03 inclusive mol percent of units of the formula $(CH_3)_2(CH_2=CH)SiO_{.5}$, there being a maximum of 9.95% by weight fluorine in said copolymeric organosiloxane.

Small amounts of other organosiloxane units can also be present in the copolymer, if desired. Thus, for example, up to about 5 mol percent of units containing ethyl, propyl, butyl, phenyl, mono- or dichlorophenyl, and trifluorotolyl radicals, in any combination and with or without the presence of the more conventional methyl radicals in the same units, can be present in the copolymer. Preferably however, the copolymer is limited to the preferred methyl, vinyl, and fluoroalkyl substituted units previously described.

The fillers employed in the elastomers of this invention can be any of the many materials which are well-known in the art for this purpose. Suitable fillers include silica, asbestos, clay, ground glass, fiber glass, carbon black, and metal oxides such as titania, zinc oxide, ferric oxide, chromic oxide, and zirconium oxide. The preferred fillers for high strength organsiloxane rubbers are the extremely finely divided silicas such as silica aerogels and fume silicas, generally known in the organosiloxane art as "reinforcing" silicas. Such silicas have been described, for example, in the Warrick Patent No. 2,541,137, issued February 13, 1951. If desired, the silica fillers can be modified by having organosiloxy groups (such as trimethylsiloxy, dimethylsiloxy, and vinyldimethylsiloxy groups), or alkoxy groups such as ethoxy or propoxy groups, attached to the surface thereof. Such surface treated silicas are well known in the art.

The specific amount of filler employed is not critical, and of course varies with the particular type of filler as well as with the particular properties desired in the vulcanized elastomer. Ordinarily from 10 to 200 parts by weight of filler per 100 parts of the organosiloxane copolymer will be used. When the filler is a reinforcing silica filler, the preferred range is from 20 to 80 parts per 100 parts of copolymer.

The copolymer-filler compositions of this invention can be "vulcanized" with any of the conventional techniques employed in vulcanizing organosilicon elastomers. This includes not only vulcanization (or curing) with chemical agents, but also vulcanization with ionizing radiation such as high speed electrons or electromagnetic radiation such as X-rays. The compositions can also be vulcanized by heat alone, although the higher temperatures and longer time required for such an operation are not preferred.

Preferred chemical agents which can be employed are the organic peroxides such as benzoyl peroxide, t-butyl perbenzoate, 2,4-dichlorobenzoyl peroxide, t-butyl peracetate and cumyl peroxide. Other chemical agents known in the art for achieving a "vulcanization" or a curing effect are useful here, and include the use of combinations of hydroxy endblocked copolymers with alkoxy polysilicates and as catalysts the metal salts of carboxylic acids such as lead 2-ethyl hexoate or dibutyltindiacetate; combinations of hydrogen containing siloxanes (such as polymers and copolymers containing $CH_3HSiO$ units) with hydroxy end-blocked copolymers and salts of carboxylic acid such as lead naphthenate and dibutyltindiacetate; and combinations of hydrogen containing siloxanes with hydroxy end-blocked copolymers and chloroplatinic acid.

By choosing the vulcanization system, rubbers can be prepared by vulcanizing at temperatures ranging from below room temperature to temperatures above 150° C. In this manner a wide range of fabrication conditions can be obtained.

The most preferred of the organic peroxides are benzoyl peroxide and 2,4 - dichlorobenzoyl peroxide. These peroxides are used in the conventional manner, generally in an amount ranging from about 0.1 to 3 inclusive percent by weight based on the weight of the copolymeric organosiloxane, the most preferred amount ranging from about 0.5 to 2% by weight.

Many additives are known for incorporation into organosiloxane rubbers to improve particular physical properties therein, and any of such conventional additives can be employed in this invention. Thus, additives to improve compression set properties (mercuric oxide for example), or additives to improve the thermal stability of the rubber (examples of which are iron and cobalt salts such as iron or cobalt octoate), and additives for improving the storage life of the unvulcanized compositions (particularly organic hydroxy compounds and hydroxy end-blocked organosiloxanes), may be added if desired.

The elastomers of this invention are prepared by mixing the copolymers, filler, any chemical vulcanizing agent employed, and any of the miscellaneous optional additives described above, and thereafter curing or vulcanizing the mixture at the proper temperature for the particular system employed.

The elastomers of this invention are particularly adapted for use as gaskets and hoses in fuel systems, hydraulic systems, and lubricating systems where exposure to hydrocarbon fuels or lubricating oils and the like requires that the rubbery material used be one which is relatively resistent to such hydrocarbons.

The following examples are illustrative only. The symbols Me, Ph, and Vi have been used to represent methyl, phenyl, and vinyl radicals respectively. All parts are parts by weight unless otherwise specified.

EXAMPLE 1

A series of copolymers was prepared by mixing $(MeViSiO)_4$, $(CF_3CH_2CH_2MeSiO)_3$, $(Me_2SiO)_4$, and $ViMe_2SiO(Me_2SiO)_4SiViMe_2$, heating the mixture to 150° C., adding sufficient potassium dimethylsilanolate to provide 1 K atom per 10,000 Si atoms, and maintaining the temperature at 150° C. for 4 hours. The amounts of the various siloxanes employed provided 0.14 mol percent MeViSiO units, from 7.5 to 15 mol percent

units, and 0.02 mol percent $ViMe_2SiO_{.5}$ units, the difference between the total of these percentages and 100 percent being $Me_2SiO$ units.

For purposes of comparison, a comparable series of copolymers was prepared in the above manner, using the same constituents except that $(PhMeSiO)_4$ was used in place of the $(CF_3CH_2CH_2MeSiO)_3$. Also for purposes of comparison, a copolymer was prepared as above described except that only 5 mol percent

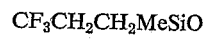

units were incorporated.

Each of the copolymers was compounded into a vulcanizable organosiloxane rubber formulation by milling together 100 parts of copolymer, 40 parts fume silica, 9 parts of an hydroxy end-blocked dimethylpolysiloxane containing 3.7% by weight hydroxyl groups, 1 part of a paste containing 50% by weight ferric oxide suspended in a dimethylpolysiloxane fluid, and 1 part of a paste containing 50% by weight of benzoyl peroxide in a dimethylpolysiloxane fluid. Samples of each compounded mixture were then cured to the vulcanized elastomeric state by heating them in a press for 5 minutes at 125° C., and each was then given an aftercure at 250° C. for 6 hours.

The low temperature flexibility of each sample was determined in accordance with the ASTM test No. D1053–54T, using a Gehman torsional balance. In this test, the sample is cooled to —120° C. and the "degrees of twist" obtainable under a given torque is determined, then the sample is warmed 5° at a time, held at the new temperature for 15 minutes, and the degrees of twist again determined. Greater degrees of twist obtainable at a given temperature indicate more flexibility at that temperature. The data obtained is set forth in Table I below.

Table I
DEGREES OF TWIST AT INDICATED CENTIGRADE TEMPERATURE

| Temp., °C. | Mol Percent $CF_3CH_2CH_2MeSiO$ | | | | | Mol Percent PhMeSiO | | | | |
|---|---|---|---|---|---|---|---|---|---|---|
| | 5% | 7.5% | 10% | 12.5% | 15% | 5% | 7.5% | 10% | 12.5% | 15% |
| −130 | 1 | 1 | 1 | 1 | 1 | | | | | |
| −110 | 30 | 13 | 3 | 2 | 2 | 1 | 1 | 1 | 1 | 1 |
| −105 | 62 | 54 | 31 | 18 | 6 | 24 | 3 | 2 | 2 | 2 |
| −100 | 75 | 90 | 78 | 77 | 51 | 55 | 36 | 9 | 2 | 2 |
| −95 | 94 | 105 | 96 | 88 | 72 | 87 | 88 | 74 | 37 | 6 |
| −90 | 40 | 110 | 105 | 94 | 86 | 92 | 102 | 111 | 96 | 68 |
| −80 | 10 | 114 | 116 | 110 | 97 | 28 | 117 | 127 | 116 | 118 |
| −70 | 16 | 115 | 121 | 111 | 100 | 14 | 119 | 129 | 122 | 125 |
| −60 | 62 | 125 | 127 | 122 | 106 | 35 | 127 | 134 | 128 | 126 |
| −50 | 124 | 125 | 127 | 128 | 114 | 128 | 133 | 142 | 132 | 134 |
| −40 | 135 | 131 | 134 | 128 | 112 | | | | | |
| +25 | 145 | 150 | 141 | 140 | 132 | 37 | 148 | 144 | 144 | 146 |

It will be seen from Table I that although the rubber containing 5 mol percent $CF_3CH_2CH_2MeSiO$ units gives an appearance of having the greater flexibility at the lowest temperatures, i.e. at −130° to −105° C., the appearance is deceiving. This is because a supercooling effect is achieved in this particular range of $CF_3CH_2CH_2MeSiO$ units which results in the flexibility actually decreasing as the sample is warmed from −95° to −80° C., at which latter point the flexibility again begins to increase. The supercooling effect also results in this rubber's being slower than the other fluoroalkyl rubbers in exhibiting an increase in flexibility as the temperature is raised from −110° to −95° C. Thus at temperatures from −100° to −50° C. the mol percent material actually is less flexible than that containing 7.5 to 12.5 percent, and from −90° to −60° C. it is less flexible than that containing 15 percent.

The data in Table I also shows that the rubber containing $CF_3CH_2CH_2MeSiO$ units is equal or superior in low temperature properties to the hitherto employed low temperature silicone rubber containing PhMeSiO units. This is brought out even more clearly in Table II below, which lists the "modulus temperatures" derivable from a plot of the data in Table I in accordance with the aforesaid ASTM test. The $T_2$, $T_5$, $T_{10}$, and $T_{100}$ modulus temperatures are the temperatures at which a given sample has 2, 5, 10 or 100 times the modulus that it has at 25° C. Thus a lower $T_2$, $T_5$, $T_{10}$, or $T_{100}$ modulus temperature indicates greater flexibility at lower temperatures. (In such terms, −100 is of course "lower" than −99, etc.)

Table II

| Mol Percent | Modulus Temperature, Degrees C. | | | |
|---|---|---|---|---|
| | $T_2$ | $T_5$ | $T_{10}$ | $T_{100}$ |
| $CF_3CH_2CH_2MeSiO$: | | | | |
| 5 | −52 | | | −118 |
| 7.5 | −45 | −100 | −104 | −112 |
| 10 | −81 | −100 | −104 | −109 |
| 12.5 | −71 | −99 | −103 | −107 |
| 15 | −69 | −97 | −101 | −106 |
| PhMeSiO: | | | | |
| 5 | −54 | | | −108 |
| 7.5 | −63 | −90 | −98 | −103 |
| 10 | −85 | −94 | −97 | −101 |
| 12.5 | −76 | −93 | −94 | −98 |
| 15 | −75 | −89 | −91 | −95 |

The $T_5$ and $T_{10}$ temperatures cannot be given in Table II for those rubbers containing 5 mol percent $CF_3CH_2CH_2MeSiO$ or PhMeSiO because of the strange supercooling effect previously discussed. In actual use of a rubber, the $T_{10}$ and $T_{100}$ temperatures are of more practical significance than the others, and it can be seen that these temperatures are 5 to 10 degrees lower in the rubbers containing $CF_3CH_2CH_2MeSiO$ units than in those containing PhMeSiO units.

EXAMPLE 2

A copolymer was prepared as in Example 1, except that it contained 7.5 mol percent $(CF_3CH_2CH_2)_2SiO$ units rather than 7.5 mol percent $CF_3CH_2CH_2MeSiO$ units. This copolymer was formulated into a vulcanizable composition as in Example 1, then vulcanized and cured as in that example and tested in accordance therewith. This rubber had the following modulus temperatures: $T_2 = -75°$ C., $T_5 = -96°$ C., $T_{10} = -100°$ C., $T_{100} = -106°$ C.

EXAMPLE 3

For purposes of comparison, copolymers were prepared in accordance with Example 1 except that they contained 20, 25, 50, and 75 mol percent of the $CF_3CH_2CH_2MeSiO$ units, and a homopolymer was prepared which contained 100 mol percent of said units. The copolymers and homopolymer were each made into a vulcanized rubber as in Example 1 and tested to determine their $T_{10}$ modulus temperatures. The values obtained are shown in Table III below, along with some of the values from Table II for easy comparison.

Table III

| Mol, percent $CF_3CH_2CH_2MeSiO$: | $T_{10}$, degree C. |
|---|---|
| 7.5 | −104 |
| 10 | −104 |
| 12.5 | −103 |
| 15 | −101 |
| 20 | −98 |
| 25 | −94 |
| 50 | −81 |
| 75 | −64 |
| 100 | −60 |

EXAMPLE 4

When copolymers are prepared as in Example 1, but containing 6.5 or 8.5 mol percent of $CF_3CF_2CH_2CH_2MeSiO$ units derived from the corresponding cyclic tetramer in place of the $CF_3CH_2CH_2MeSiO$ units (thus providing about 7.55 and 9.48% by weight fluorine respectively in the resulting copolymers), rubbers prepared from the copolymers show comparable low temperature flexibility. Such rubbers are far more resistant to attack by solvents than rubbers made from copolymers of $Me_2SiO$ and PhMeSiO units.

EXAMPLE 5

Portions of rubber samples prepared in accordance with Examples 1 and 2 were tested to determine their durometer (Shore hardness), tensile strength in p.s.i., and percent elongation at break. Other portions of the same samples were then heated in "ASTM No. 3 Oil" for 70 hours at 300° F., and the values redetermined to find the percent change in properties (i.e. "Δ Dur.," "Δ Ten.," and "Δ Elong."). Resistance to the oil was also measured by determining the change in volume ("Δ Vol.") of the test specimen after this exposure, in accordance with ASTM Test No. D471-55T. The results are shown in Table IV below.

meric organosiloxane, (II) a filler for organosilicon rubber and (III) an organic peroxide vulcanizing agent.

3. A vulcanizable composition in accordance with claim 2 wherein the vulcanizing agent is benzoyl peroxide, said agent being present in an amount of from 0.1 to 3% by weight based on the weight of the copolymeric organosiloxane.

4. A vulcanizable composition comprising (I) a copolymeric organosiloxane consisting essentially of (A)

Table IV

| | Mol Percent $CF_3CH_2CH_2MeSiO$ | | | | | Mol Percent $PhMeSiO$ | | | | | Mol Percent $(CF_3CH_2CH_2)_2SiO$ |
|---|---|---|---|---|---|---|---|---|---|---|---|
| | 5 | 7.5 | 10 | 12.5 | 15 | 5 | 7.5 | 10 | 12.5 | 15 | 7.5 |
| Durometer [1] | 63 | 63 | 64 | 66 | 66 | 65 | 61 | 60 | 63 | 65 | 65 |
| Tensile [1] | 1,180 | 1,115 | 1,050 | 1,060 | 1,105 | 935 | 1,170 | 1,060 | 1,075 | 1,200 | 920 |
| Elongation [1] | 430 | 450 | 430 | 450 | 430 | 360 | 480 | 420 | 550 | 510 | 305 |
| Δ Dur. [2] | −56 | −57 | −45 | −39 | −39 | −77 | [3] | [3] | [3] | [3] | −52 |
| Δ Ten. [2] | −72 | −70 | −68 | −65 | −65 | −96 | [3] | [3] | [3] | [3] | −61 |
| Δ Elong. [2] | −7 | −7 | −23 | −15 | −14 | −42 | [3] | [3] | [3] | [3] | +10 |
| Δ Vol. [2] | +25 | +25 | +30 | +28 | +26 | +72 | [3] | [3] | [3] | [3] | +20 |

[1] Original properties.
[2] Percent property change after oil exposure.
[3] Samples disintegrated by hot oil treatment.

It will be seen from the data in Table IV that the rubbers containing $CF_3CH_2CH_2MeSiO$ or $$(CF_3CH_2CH_2)_2SiO$$

units are approximately equivalent in their normal physical properties to those containing PhMeSiO units. After exposure to the test oil, however, all of the latter types of rubber except that which contained 5 mol percent PhMeSiO units were disintegrated, and the one intact specimen was far inferior to the rubbers of this invention in its retention of original physical properties.

EXAMPLE 6

When copolymers are prepared containing only $Me_2SiO$ units and $CF_3CH_2CH_2MeSiO$ units (the latter ranging from 6.5 to 15 mol percent of the total copolymeric units), and the copolymers are milled with 25 to 50 parts of a silica aerogel and 1 part of benzoyl peroxide or bis(2,4-dichlorobenzoyl) peroxide per 100 parts of copolymer, and the mixtures heated at 120° to 150° C. until cured, the resulting rubbers are flexible at temperatures down to about −110° C. and are more resistant to swelling in hydrocarbon solvents and oils than the corresponding rubbers prepared from $Me_2SiO$ polymers or $Me_2SiO$-PhMeSiO copolymers.

That which is claimed is:

1. A vulcanizable composition comprising (I) a copolymeric organosiloxane consisting essentially of (A) from 6.5 to 15 inclusive mol percent of polymeric units of the formula $$[CF_3(CF_2)_xCH_2CH_2](CH_3)_y(CF_3CH_2CH_2)_zSiO$$

where $x$, $y$ and $z$ are integers of from 0 to 1 inclusive, the sum of $x+z$ being from 0 to 1 inclusive and the sum of $y+z$ being 1, and (B) from 85 to 93.5 inclusive mol percent of units of the formula $(CH_3)_2SiO$, there being a maximum of 9.95% by weight fluorine in said copolymeric organosiloxane, (II) a filler for organosilicon rubber, and (III) an organosiloxane vulcanizing agent.

2. A vulcanizable composition comprising (I) a copolymeric organosiloxane consisting essentially of (A) from 6.5 to 15 inclusive mol percent of polymeric units of the formula $$[CF_3(CF_2)_xCH_2CH_2](CH_3)_y(CF_3CH_2CH_2)_zSiO$$

where $x$, $y$ and $z$ are integers of from 0 to 1 inclusive, the sum of $x+z$ being from 0 to 1 inclusive and the sum of $y+z$ being 1, and (B) from 85 to 93.5 inclusive mol percent of units of the formula $(CH_3)_2SiO$, there being a maximum of 9.95% by weight fluorine in said copolyfrom 6.5 to 14.95 inclusive mol percent of polymeric units of the formula $$[CF_3(CF_2)_xCH_2CH_2](CH_3)_y(CF_3CH_2CH_2)_zSiO$$

where $x$, $y$ and $z$ are integers of from 0 to 1 inclusive, the sum of $x+z$ being from 0 to 1 inclusive and the sum of $y+z$ being 1, (B) from 85 to 93.45 inclusive mol percent of units of the formula $(CH_3)_2SiO$, (C) from 0.05 to 0.35 inclusive mol percent of units of the formula $$(CH_2{=}CH)CH_3SiO$$

and (D) from 0 to 0.03 inclusive mol percent of units selected from the group consisting of units of the formula $(CH_3)_3SiO_{.5}$ and $(CH_3)_2(CH_2{=}CH)SiO_{.5}$, there being a maximum of 9.95% by weight fluorine in said copolymeric organosiloxane, (II) a filler for organosilicon rubber, and (III) an organosiloxane vulcanizing agent.

5. A vulcanized elastomeric composition comprising (I) a copolymeric organosiloxane consisting essentially of (A) from 6.5 to 15 inclusive mol percent of polymeric units of the formula $$[CF_3(CF_2)_xCH_2CH_2](CH_3)_y(CF_3CH_2CH_2)_zSiO$$

where $x$, $y$ and $z$ are integers of from 0 to 1 inclusive, the sum of $x+z$ being from 0 to 1 inclusive and the sum of $y+z$ being 1, and (B) from 85 to 93.5 inclusive mol percent of units of the formula $(CH_3)_2SiO$, there being a maximum of 9.95% by weight fluorine in said copolymeric organosiloxane, and (II) a filler for organosilicon rubber.

6. A vulcanized elastomeric composition in accordance with claim 5 wherein the filler is a reinforcing silica filler.

7. A vulcanized elastomeric composition comprising (I) a copolymeric organosiloxane consisting essentially of (A) from 6.5 to 14.95 inclusive mol percent of polymeric units of the formula $$[CF_3(CF_2)_xCH_2CH_2](CH_3)_y(CF_3CH_2CH_2)_zSiO$$

where $x$, $y$ and $z$ are integers of from 0 to 1 inclusive, the sum of $x+z$ being from 0 to 1 inclusive and the sum of $y+z$ being 1, (B) from 85 to 93.45 inclusive mol percent of units of the formula $(CH_3)_2SiO$, (C) from 0.05 to 0.35 inclusive mol percent of units of the formula $$(CH_2{=}CH)CH_3SiO$$

and (D) from 0 to 0.03 inclusive mol percent of units selected from the group consisting of units of the formula $(CH_3)_3SiO_{.5}$ and $(CH_3)_2(CH_2{=}CH)SiO_{.5}$, there being a maximum of 9.95% by weight fluorine in said copolymeric organosiloxane, and (II) a filler for organosilicon rubber.

8. A vulcanizable composition comprising (I) a copolymeric organosiloxane consisting essentially of (A) from 7.5 to 14.95 inclusive mol percent of polymeric units of the formula $(CF_3CH_2CH_2)(CH_3)SiO$, (B) from 85 to 92.45 inclusive mol percent of units of the formula $(CH_3)_2SiO$, (C) from 0.05 to 0.35 inclusive mol percent of units of the formula $(CH_2=CH)CH_3SiO$, and (D) from 0 to 0.03 inclusive mol percent of units of the formula $(CH_3)_2(CH_2=CH)SiO_{.5}$, there being a maximum of 9.95% by weight fluorine in said copolymeric organosiloxane, (II) a reinforcing silica filler in an amount of from 20 to 80% by weight based on the weight of the copolymeric organosiloxane, and (III) benzoyl peroxide in an amount of from 0.5 to 2% by weight based on the weight of the copolymeric organosiloxane.

9. A vulcanized elastomeric composition comprising (I) a copolymeric organosiloxane consisting essentially of (A) from 7.5 to 14.95 inclusive mol percent of polymeric units of the formula $(CF_3CH_2CH_2)(CH_3)SiO$, (B) from 85 to 92.45 inclusive mol percent of units of the formula $(CH_3)_2SiO$, (C) from 0.05 to 0.35 inclusive mol percent of units of the formula $(CH_2=CH)CH_3SiO$, and (D) from 0 to 0.03 inclusive mol percent of units of the formula $(CH_3)_2(CH_2=CH)SiO_{.5}$, there being a maximum of 9.95% by weight fluorine in said copolymeric organosiloxane, and (II) a reinforcing silica filler in an amount of from 20 to 50% by weight based on the weight of (I).

References Cited in the file of this patent

UNITED STATES PATENTS

| | | |
|---|---|---|
| 2,445,794 | Marsden | July 27, 1948 |
| 2,897,869 | Polmanteer | Aug. 4, 1959 |

FOREIGN PATENTS

| | | |
|---|---|---|
| 571,381 | Canada | Feb. 24, 1959 |

OTHER REFERENCES

Hurd et al.: Ind. and Eng. Chem., November 1948, vol. 40, No. 11, pages 2078–2081.

Clark, Jr.: WADC Technical Report 54–213, July 1954, Wright Air Development Center, Wright-Patterson Air Force Base, Dayton, Ohio.

Dyckes: WADC Tech. Report 55–220, part III, pages 48–53, September 1957.

UNITED STATES PATENT OFFICE
CERTIFICATE OF CORRECTION

Patent No. 3,050,492                                        August 21, 1962

Keith E. Polmanteer et al.

It is hereby certified that error appears in the above numbered patent requiring correction and that the said Letters Patent should read as corrected below.

Column 4, line 69, for "-120° C." read -- -130° C. --; column 5, line 34, after "the" insert -- 5 --.

Signed and sealed this 16th day of April 1963.

(SEAL)
Attest:

ERNEST W. SWIDER                                      DAVID L. LADD
Attesting Officer                                        Commissioner of Patents